United States Patent
Imamura et al.

[11] Patent Number: 5,200,011
[45] Date of Patent: Apr. 6, 1993

[54] NON-DIGGING TUBE REVERSE LINING ENGINEERING METHOD OF CONDUIT

[75] Inventors: Minoru Imamura, Yokohama; Hiroaki Kobayashi, Tokyo; Shigeru Toyoda, Urawa; Seiichi Ikeda, Kawasaki, all of Japan

[73] Assignee: Tokyo Gas Co., Ltd., Tokyo, Japan

[21] Appl. No.: 674,347

[22] PCT Filed: Sep. 4, 1990

[86] PCT No.: PCT/JP90/01123
§ 371 Date: Apr. 25, 1991
§ 102(e) Date: Apr. 25, 1991

[87] PCT Pub. No.: WO91/03369
PCT Pub. Date: Mar. 21, 1991

[30] Foreign Application Priority Data
Sep. 5, 1989 [JP] Japan ............ 1-230879

[51] Int. Cl.$^5$ .......... B29C 63/28; B29C 63/36
[52] U.S. Cl. .................. 156/156; 156/267; 156/287; 156/294
[58] Field of Search ........... 156/64, 156, 267, 287, 156/294, 251; 264/269, 516, 573, 138; 138/97, 98; 166/54.5, 55.2, 54.6; 409/143

[56] References Cited

U.S. PATENT DOCUMENTS

| | | | |
|---|---|---|---|
| 1,491,610 | 4/1924 | Liady | 166/54.6 |
| 3,036,522 | 5/1962 | Lindsey | 166/54.6 |
| 4,434,115 | 2/1984 | Chick | 156/287 |
| 4,778,553 | 10/1988 | Wood | 156/294 |
| 4,786,345 | 11/1988 | Wood | 156/294 |
| 4,956,041 | 9/1990 | Miyazaki et al. | 156/294 |
| 5,034,180 | 7/1991 | Steketee | 156/294 |

FOREIGN PATENT DOCUMENTS

| | | | |
|---|---|---|---|
| 0095524 | 7/1980 | Japan | 156/294 |
| 0087019 | 5/1983 | Japan | 156/156 |
| 0208014 | 12/1983 | Japan | 156/294 |
| 60-141527 | 7/1985 | Japan | . |
| 0135342 | 6/1987 | Japan | 156/287 |
| 62-149420 | 7/1987 | Japan | . |
| 0156926 | 7/1987 | Japan | 156/293 |
| 0284727 | 12/1987 | Japan | 156/293 |
| 0039321 | 2/1988 | Japan | 156/293 |
| 0001707 | 3/1988 | Japan | 156/287 |
| 0286325 | 11/1988 | Japan | 156/294 |
| 0316247 | 12/1989 | Japan | 156/293 |

Primary Examiner—Michael W. Ball
Assistant Examiner—Steven D. Maki
Attorney, Agent, or Firm—McGlew and Tuttle

[57] ABSTRACT

An engineering method of providing a lining onto the internal face of conduits for gas, city water, etc. that are buried underground. This lining work shall entirely be done from the portions exposed above ground. The distance of the supply pipe to the service tee is measured. The lining tube is set to a length that is slightly longer than this distance. The lining tube is turned inside out inside the supply pipe. As a result, a slightly longer length of non-reverse portion is left inside the supply pipe by the service tee. This non-reverse portion is helpful when cutting the rewinding tape that is tied to the lining tube after the insertion of a cutter. Next the heating tube shall be reversed similarly, and a hot water hose is inserted for circulating hot water in the heating tube. The aforesaid lining tube coated with the thermosetting adhesive is bonded onto the internal face of supply pipe. Next the heating tube is pulled out and the rewinding tape of the lining tube is cut and removed. A fusion-cutting heat rod is inserted for fusion-cutting the tip of lining tube for an opening. Then the fusion-cutting heat rod is pulled out.

3 Claims, 4 Drawing Sheets

NON-DIGGING TUBE REVERSE LINING ENGINEERING METHOD OF CONDUIT

FIELD OF THE INVENTION

The present invention relates to the tube reverse lining engineering method for repairing a conduit from its internal face by reversing or turning inside out the tube shaped lining material and using fluid pressure for closely adhering the lining to the internal face of gas, city water, etc. conduit, that has been buried underground. More particularly the present invention relates to the non-digging tube reverse lining engineering method of conduit where all the work can be done from a single place of the pipe line that should be repaired.

BACKGROUND OF THE INVENTION

The conventional tube reverse lining engineering method that is applied to guide conduit buried underground will be explained on the basis of FIG. 8. This engineering method digs a work ditch 02 to the branch section of main pipe 01 in order to expose the service tee 03 for a branch connection that is fitted to the said main pipe 01. This engineering method also reversely advances the lining tube 010 into the supply pipe 09 by use of a machine for turning a lining inside out, also known as a reverse machine 08, from the meter riser pipe 06 side that is exposed to the ground on the user's side and also ends the reverse when the reversing lining has reached the internal side of service tee 03. At this point the tip of lining tube 010 is cut open, and a terminal machine is 05 is installed onto the service tee 03. A heater 011 is connected to the side of terminal machine 05 and the side of meter riser pipe 06 for circulating hot water as shown by the arrow. The hot water flows into the reverse lining tube 010 to harden the thermosetting adhesive agent coated to the lining tube 010, thereby pasting up the lining tube 010 that has already been lined to the entire internal face of supply pipe 09.

In this way, because the work ditch 02 needs to be dug at the branch section of main pipe 01 in the conventional tube reverse lining engineering method, a great deal of labors and expenditures are needed for the digging and back-filling. In addition, there is the problem of traffic hindrance in the case of the work ditch being in a street.

Therefore, the applicant of this invention proposes a tube reverse lining engineering method to be done without digging the work ditch 02 in the branch section of main pipe 01 as Japan Patent Application No. Showa 63 (or 1988)—147,549 discloses.

This engineering method of Japan Patent Application No. 147,549 is for conducting all the lining works from the terminal, for example, the meter riser tube of supply pipe that has exposed to the ground. The engineering method is described below.

a. A reverse machine shall be connected to the terminal of supply pipe to be lined and the lining tube coated with the thermosetting adhesive agent shall be reversed so that it may pass inside the supply pipe from the inlet of supply pipe and reach the inside of main pipe.

b. Next, the heating tube shall be reversed inside the lining tube so that it may similarly reach the inside of main pipe.

c. Then, a lengthy rod fitted with a metal detecting sensor at its tip shall be inserted for detecting the branch section of main pipe.

d. Once the branch section has been detected, the lengthy rod shall be fixed to that position, a tape connected to the end terminal of heating tube shall be pulled for pulling the tip side until it is to be blocked by the tip of lengthy rod, and the tip of heating tube shall be coincided with the branch section of main pipe.

e. Next, the lengthy rod shall be pulled out, and instead, the hot water hose fitted with a hot water spray nozzle at its tip shall be inserted until it may reach the end of heating tube.

f. Then, the heater shall be connected to the heating tube and to the hot water tube for circulating the hot water inside the heating tube and hot water tube, and the thermosetting adhesive agent coated to the lining tube shall be hardened for bonding the lining tube up to the branch section of main pipe via the service tee from the internal face of supply pipe.

g. Next, the hot water tube shall be pulled out, then the heating tube shall be pulled back by use of the tape connected to the heating tube.

h. Then, the tip side of lining tube that has entered into the main pipe shall be pulled for its return back to the branch section of main pipe.

i. Next, the lining tube drilling tool with use of an electric heater shall be inserted up to the tip of lining tube that has been drawn back, where the heater shall be electrified for its heating up for melting the lining tube and for drilling a hole to the lining tube in order to open main pipe interior with the supply pipe interior, then the drilling tool shall be pulled out, and the tip side of lining tube that has been pulled back to the supply pipe interior and has been cut through the said melting shall be recovered by pulling the tape.

This is the non-digging tube reverse lining engineering method of conduit.

The above mentioned engineering method is an engineering method for lining the section up to the branch section of main pipe via the service tee from the supply pipe, but this invention won't line the section up to the branch section of main pipe because a time is required for inspecting the branch section of the lining method should be adopted, and it is an object of this invention to present the non-digging tube reverse lining engineering method of conduit to be lined up to the connection between the service tee and the supply pipe.

SUMMARY AND OBJECTS OF THE PRESENT INVENTION

The present invention relates to the non-digging tube reverse lining engineering method of conduit having the following processes:

Inserting a lengthy coil with a sensor from the opening section of supply pipe that has previously been exposed to the ground. The inserting being for measuring the distance and pipe line situation u to the connection between the service tee and the branch pipe.

Next, providing a length of lining tube coated with thermosetting adhesive agent. The length being a bit longer than the measured distance described above. The lining tube is connected with a rewinding tape at a terminal end and then inserted and turned inside out up to the connection between the service tee and the supply pipe. All this is performed from the exposed section of the supply pipe. During the reversing, or turning inside out, a non-reversed section at the terminal end of the lining tube is left unturned a bit inside the supply pipe as it is.

Secondly, reversing the heating tube, connected similarly with a pulling tape, during its insertion into the lining tube described above.

Next, inserting the hot water hose inside and up to a position close to the tip of the heating tube. A heater is connected to this hot water hose and the heating tube for circulating the hot water inside the hot water hose and the heating tube in order to harden the thermosetting adhesive agent that has been coated onto the lining tube. This thereby bonds the lining tube to the internal face of supply pipe.

Next, pulling the hot water hose and then pulling back the heating tube for its recovery while utilizing the tape.

Then, inserting the tape melting rod into the pipe while passing the rewinding tape through an electric heater system ring-shaped cutter at the tip of the tape melting rod. The tip of the melting rod fusion-cutting the rewinding tape at its connected section. Pulling this fusion-cut rewinding tape for its recovery and then pulling out the tape melting rod.

Then, inserting into the pipe the fusion-cut rod fitted with the electric heater system fusion head at its tip. Pressing the fusion head against the tip of lining tube for electrifying and heating the rod to fusion-cut the tip of lining tube, thereby opening the main pipe interior and the supply pipe interior. Then pulling out the fusion-cut rod.

All the work can be done from the portion of the supply pipe or conduit exposed above ground and a work ditch need not be dug.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 7 is a cross sectional view of pipe line in the situation where all the lining works have been through.

DETAILED DESCRIPTION OF THE PREFERRED EMBODIMENT

The present invention is explained in detail in accordance with the attached drawings.

Figure 1:
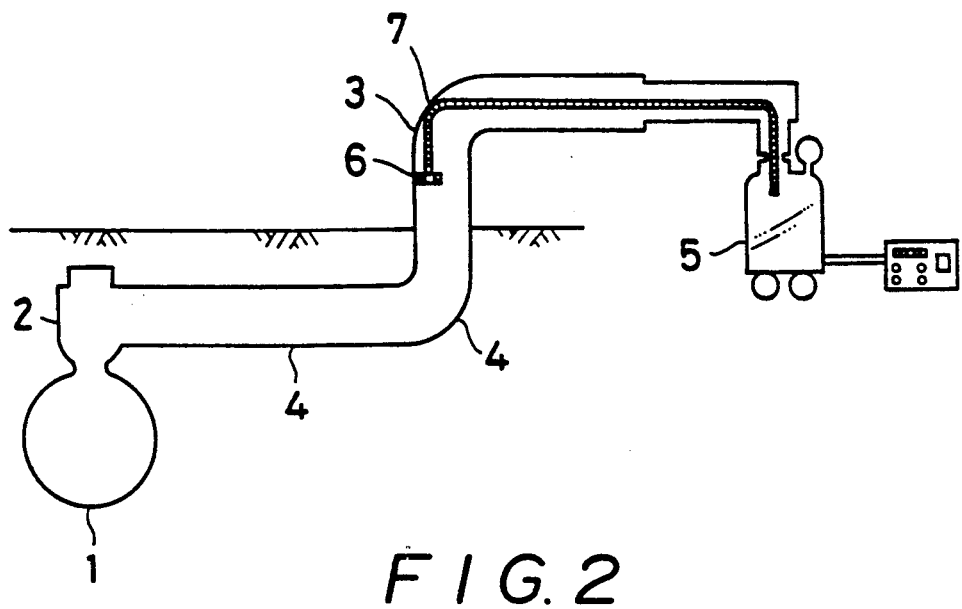
FIG. 1 is an explanatory drawing in the situation where the length of pipe line to be lined is being measured with use of a length measuring coil.

This embodiment describes tube-lining the entirety of a pipe internal face that is called the supply pipe which leads to the meter riser pipe from the service tee that is attached to the main pipe in the gas conduit buried underground. As shown in FIG. 1, supply pipe 4 is a branch member that is attached to the main pipe 1. The distance of supply pipe 4 to the service tee 2 shall be measured with use of a length measuring machine 5 from the side of meter riser pipe 3. In performing this measurement, such information as the kind and quantity of couplings in the midway is also collected in addition to the extended distance. A sensor 6 is attached to the tip of a length measuring coil 7 which is extruded from the length measuring machine 5. Coupling sections, etc. in the midway are detected, for example, through sound, and the insertion of coil 7 shall be stopped at the location where the sensor 6, attached to the tip of coil 7, has detected the service tee 2. Thus the length of supply pipe 4 shall be measured from the length of the inserted coil 7.

Figure 2:
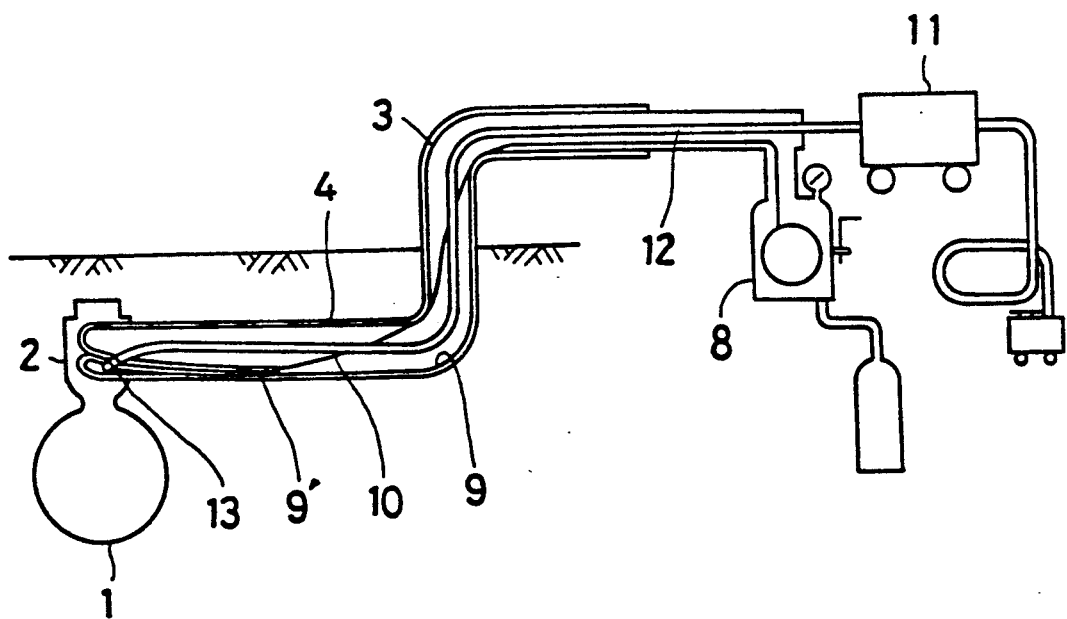
FIG. 2 is an explanatory drawing in the situation where the lining tube has been reversed inside the pipe line.

Next, as shown in FIG. 2, the lining tube 9 coated with the thermosetting adhesive agent shall be reversed from the side of meter riser pipe 3 by use of the machine for turning a liner inside out or the reverse machine 8. In this case, a rewinding tape 10 shall be connected (tied) to the terminal of lining tube 9 and the length of lining tube 9 shall also be set to a length slightly longer than the distance that has previously been measured.

The lining tube 9 shall be reversed with use of the reverse machine 8 and the induction machine 11 for extruding the induction rod 12. The induction rod 12 pushes the reverse section of the lining tube 9 by its tip 13. This guides the direction of advancement and helps the reverse section advance smoothly inside the pipe.

This reversing stops at the location where the lining tube 9 has reached the interior of service tee 2.

Figure 3:
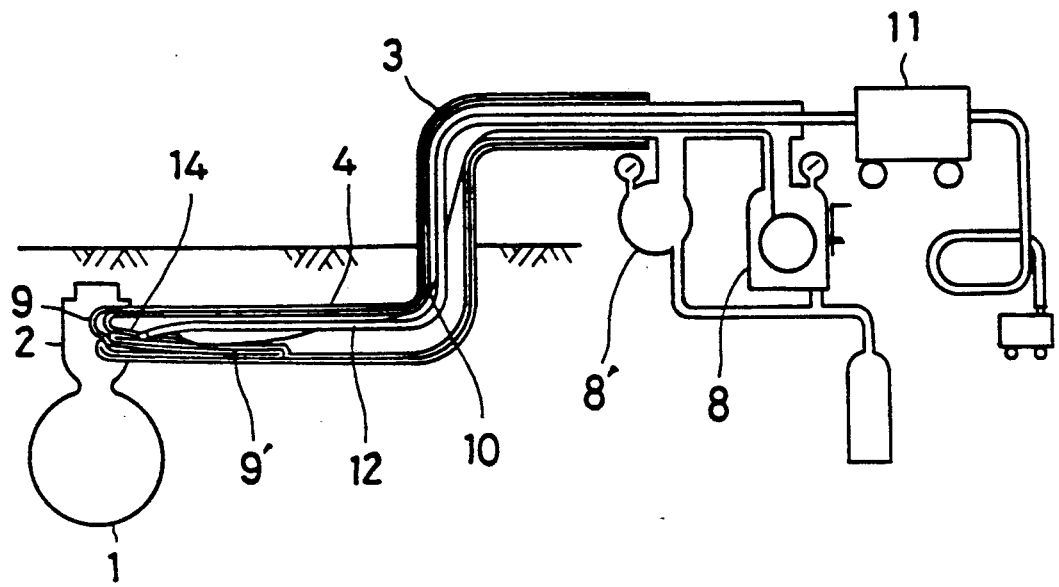
FIG. 3 is an explanatory drawing in the situation where the lining tube has been inserted into the reversed pipe line while reversing the heating tube.

Next, as shown in FIG. 3, the heating tube 14 is also reversed inside the lining tube 9 that has already reversed as described above.

No adhesive agent has been coated to this heating tube 14 and a pulling back tape has been tied to the heating tube 14.

Figure 4:
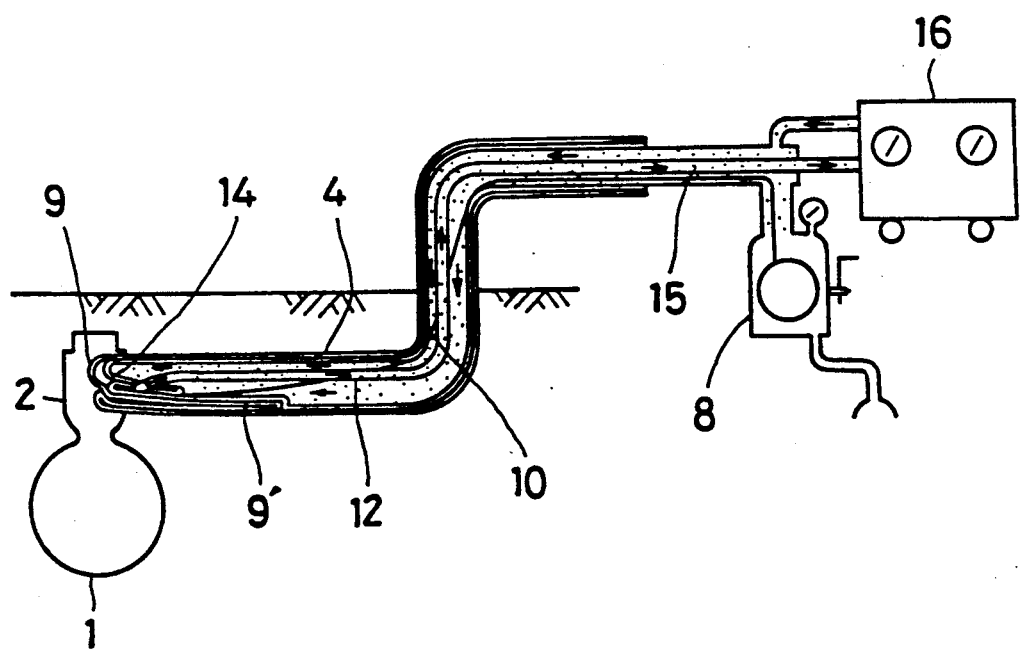
FIG. 4 is an explanatory drawing in the situation where the hot water hose has been inserted up to its tip into the heating tube, and the heater has been connected for circulating the hot water into the hot water hose and the heating tube.

At the next step, as shown in FIG. 4, the hot water hose 15 shall be inserted into the heating tube 14. The heating machine 16 is connected to the hot water hose 15 and the heating tube 14 for circulating the hot water into the heating tube 14 and the hot water hose 15. The hot water has been heated to a temperature around 70° C. so as to harden the bonding agent of lining tube 9. As a result, the lining tube 9 is closely adhered entirely inside the supply pipe 4 from the meter riser pipe 3. However, a small portion of non-reverse section 9' of lining tube 9 is left over on the tip side (the side of service tee 2) of supply pipe 4.

Figure 5:
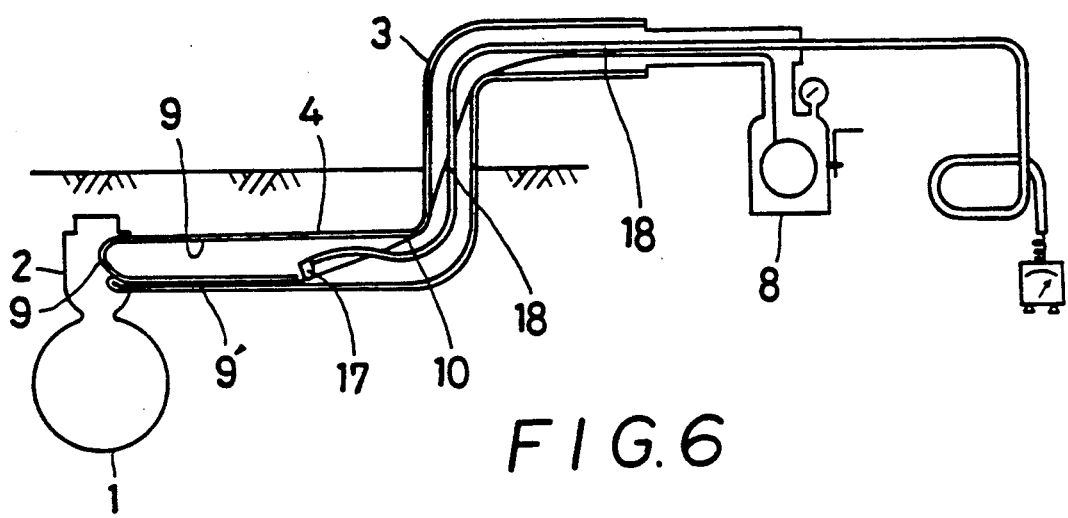
FIG. 5 is an explanatory drawing in the situation where the rewinding tape is being fusion-cut with use of a cutter.

Next, the hot water hose 15 shall be pulled out, moreover the pulling back tape shall be pulled for pulling back and recovering the heating tube 14. Then as shown in FIG. 5, the rewinding tape 10 of lining tube 9 shall be passed through the ring shaped electric heater type cutter 17 while inserting the tape melting rod 18. The tape melting rod 18 is a first rod for melting and cutting the rewinding tape, wherein this first rod has the ring shaped electric heater type cutter at one end. The tape melting rod 18 is stopped at the previous location of non-reverse section 9'. Then the cutter 17 shall be electrified for heating and fusion-cutting the rewinding tape 10. The tape fusion-cutting rod 18 is then pulled out, and the fusion-cut rewinding tape 10 is recovered.

Figure 6:
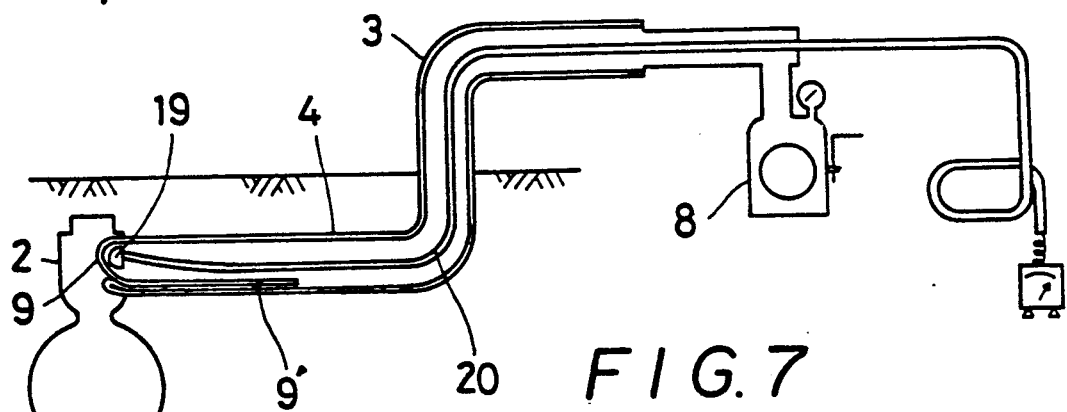
FIG. 6 is an explanatory drawing in the situation where the tip of lining tube is fusion-cut with use of fusion-cut head for providing a hole therein.

Next, as shown in FIG. 6, the fusion-cut rod 20 having an electric heater type fusion-cutting head at its tip shall be inserted into the supply pipe 4 until it collides against the tip of lining tube 9. The fusion-cut rod 20 is a second rod for heating and opening a tip of a reverse portion of the lining tube, wherein the second rod has an electric heater system fusion heat at the tip. The fusion-cut rod 20 is electrified for heating up the fusion-cutting head 19. After the tip of lining tube 9 has been fusion-cut for opening the tip of lining tube 9 (the main pipe 1 and the supply pipe 4), the fusion-cutting rod 20 is pulled out.

Figure 7:
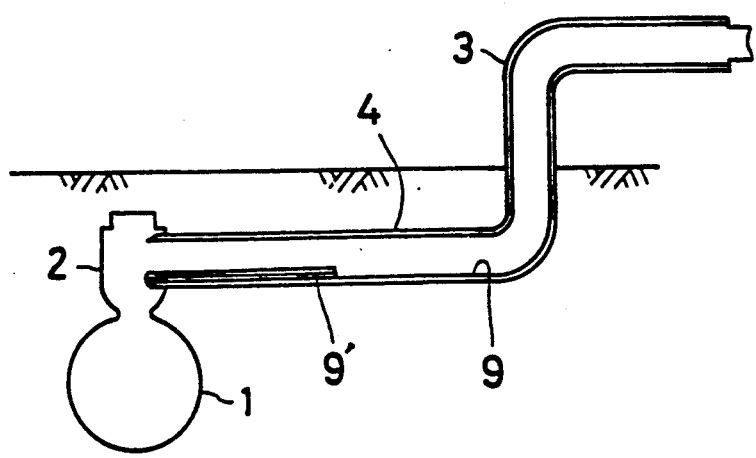
Figure 8:
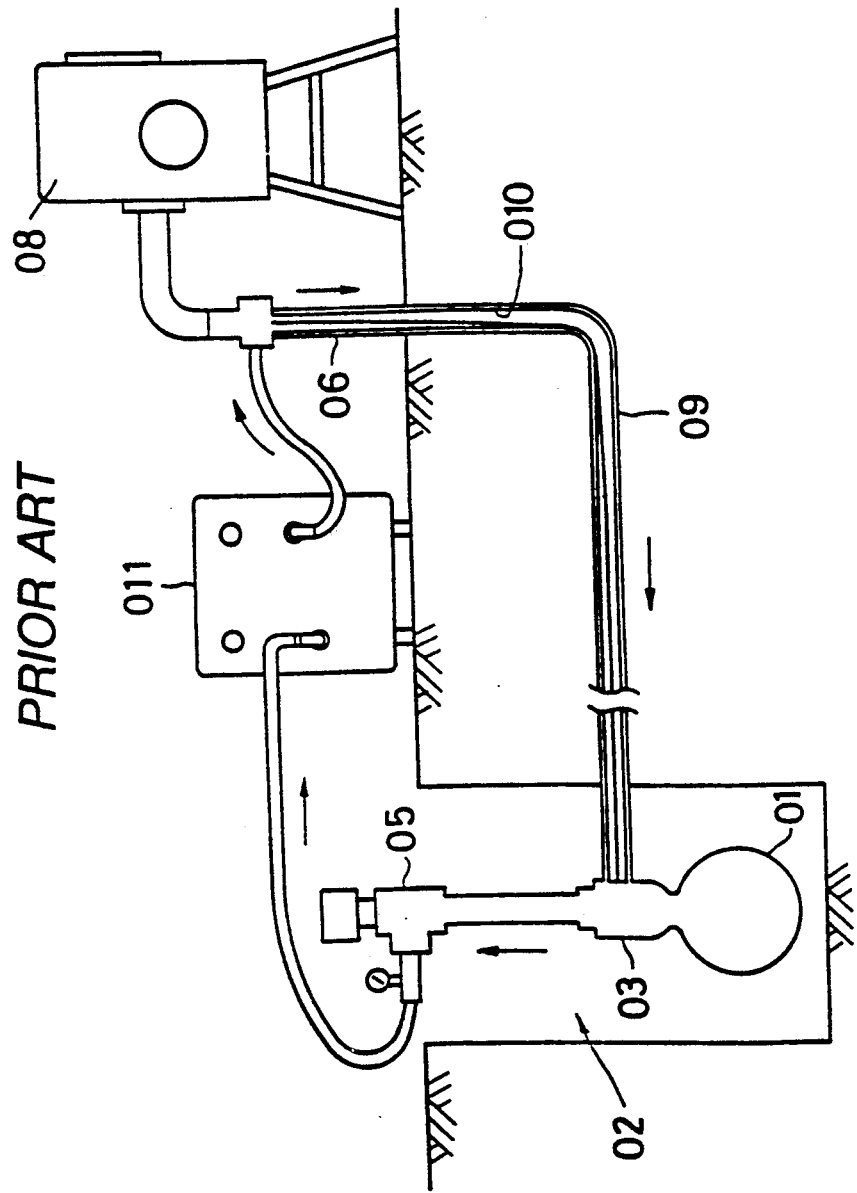
FIG. 8 is an explanatory drawing of conventional tube reverse lining engineering method.

FIG. 7 shows the side of service tee 2 of supply pipe 4 in the situation where the lining has been opened by the tip in this way.

Industrial Utilization Possibility

Because all the tube reverse lining works can be done from an above ground exposed portion, such as the meter riser pipe as described above, the present invention has the industrial utilization possibility as follows.

a. The work ditch needs not be dug on the main pipe side as it has been conventionally needed. Therefore the reduction in expenditure for digging and back-filling this work ditch is removed. Also the problem of traffic disturbance, that becomes problematic because the main pipe exists usually under a public street, can also be eliminated.

b. Because in the present invention the tube reverse ends at the location of service tee (branch member) from the supply pipe and will not be reversed up to the main pipe from the inside of service tee, the reversed lining tube is prevented from entering into the main pipe and becoming a resistance to the flow of main pipe.

c. In the case of reversing the section up to the branch portion of main pipe, it is difficult to detect this branch section, and in the past this detection caused a great deal of trouble, but because this present invention only requires the measurement of distance up to the service tee and the reverse in line with the said distance, no trouble is necessary for searching the branch section as it was required in the past. The present invention thereby enhances the work efficiency.

d. The cut location of this rewinding tape can be understood well and has the effect of failing to cut the tip side of rewinding tape because the inserted cutter is stopped by the non-reverse section when cutting the rewinding tape for recovery. This is caused by setting the lining tube to a slightly longer size and having the non-reverse portion remaining a bit inside the pipe.

We claim:

1. A method for applying a lining tube, coated with a thermosetting adhesive, to an inside of a conduit, the method comprising the steps of:
   measuring a distance from an exposed portion of the conduit to a service tee of the conduit;
   providing a length of the lining, said length being longer than said measured distance;
   connecting a rewinding tape to an end of said length of lining tube;
   inserting said length of lining tube into the conduit;
   turning said length of lining tube inside out during said inserting until said length of lining tube reaches said service tee, said turning inside out leaving a portion of said length of lining tube unturned at an end of the conduit adjacent said service tee;
   providing a heating tube;
   connecting a pull-out tape to an end of said heating tube;
   inserting said heating tube inside said turned out lining tube;
   turning said heating tube inside out during said inserting of said heating tube;
   inserting a hot water hose inside said turned out heating tube;
   circulating hot water through said heating tube and said hot water hose, said hot water being of a temperature to harden and bond the thermosetting adhesive on said turned out lining tube, said lining tube being bonded with the inside of the conduit by said hardening;
   removing said hot water hose from inside said turned out heating tube;
   removing said heating tube from inside said turned out lining tube with said pull-out tape;
   providing a first rod having a ring shaped heat cutter at one end;
   passing said ring shaped heat cutter around said rewinding tape;
   inserting said first rod into said turned out lining tube until said ring shaped heat cutter is adjacent said end of said portion of unturned lining tube;
   heating said ring shaped heat cutter and cutting said rewinding tape from said unturned portion of lining tube;
   removing said first rod and rewind tape from said turned out lining tube;
   inserting a second rod with a heat fusion head into said turned out lining tube;
   fusion cutting an opening in said turned out lining tube at said service tee; and
   removing said second rod from said turned out lining tube.

2. A method in accordance with claim 1, wherein:
   said circulating hot water is of a pressure to bond said turned out lining tube to the inside of the conduit.

3. A method in accordance with claim 1, wherein:
   said fusion head cuts said opening in said turned out lining tube where said turned out lining tube meets said unturned portion of said length of lining tube.

* * * * *